United States Patent Office 2,983,351
Patented May 9, 1961

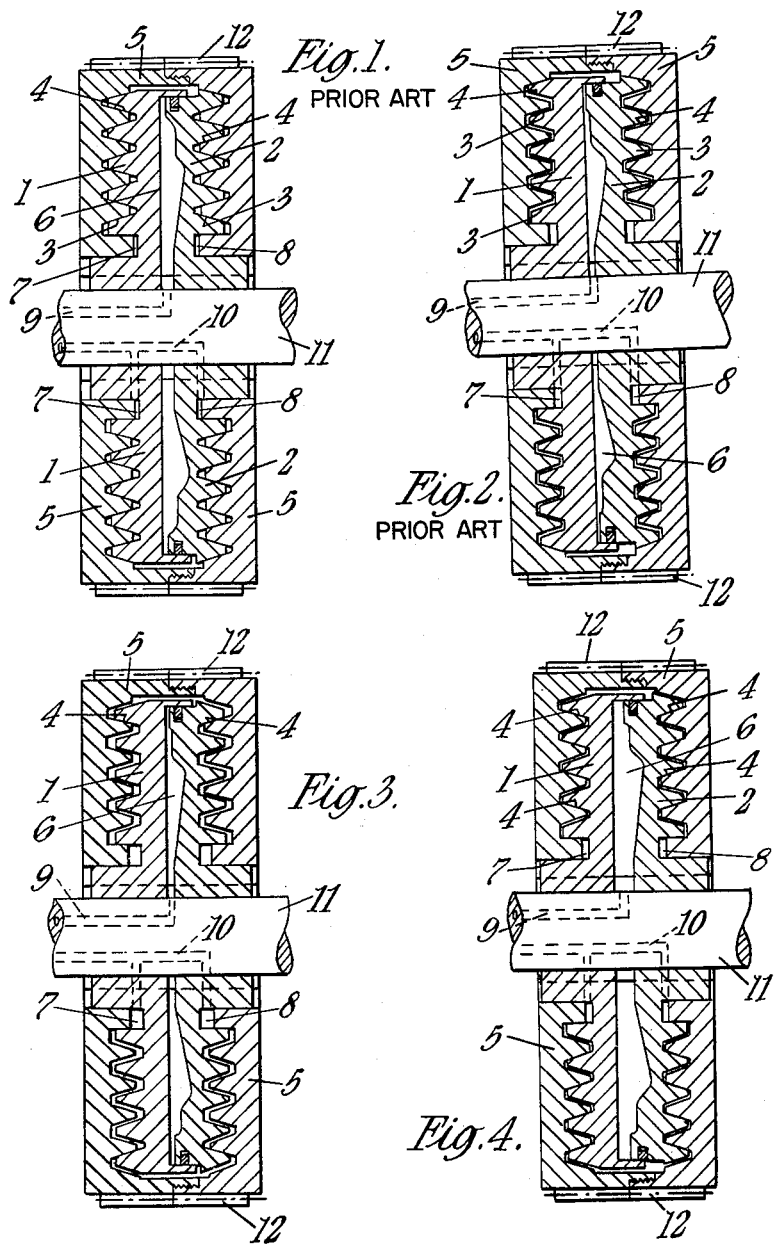

2,983,351
FLUID PRESSURE-OPERATED CLUTCHES WITH METAL TO METAL FRICTION SURFACES

Thomas Hindmarch, Lindo Lodge, Stanley Ave., Chesham, England

Filed Aug. 19, 1959, Ser. No. 834,719

Claims priority, application Great Britain Aug. 29, 1958

3 Claims. (Cl. 192—86)

The invention relates to fluid pressure operated clutches with metal to metal friction surfaces of the kind comprising a hollow outer clutch member and a pair of disc-like inner clutch members mounted back to back upon a shaft and within said outer clutch member adapted to be moved away from one another under fluid pressure to contact with their friction surfaces corresponding friction surfaces upon the outer clutch member to engage the clutch.

When clutches of the kind above referred to, have been required to transmit torques in marine, locomotive and industrial transmissions, the coacting friction surfaces have been constructed with concentrically rigid V-grooved inter-engaging surfaces so that the wedge-shaped ridges of one part fit into the similar and co-operating grooves in the other part on the principle that for a given diameter an increased area of surface contact is thereby obtained with resultant diminution of surface stress.

Also, in these clutches it is well known that dissimilar metals must be employed for the sake of compatabilities of the rubbing surfaces. It has, therefore, become customary to form the outer clutch member in ferrous metal and the inner clutch members in non-ferrous metal.

It is also proposed to construct the disc-like inner clutch members so as to be capable of telescopic engagement with one another so as to provide a fluid pressure chamber between the members which chamber is expanded to engage the clutch. Other chambers may be provided for disengagement of the clutch. The pressure fluid used for engagement may be caused to flow continuously through the engaging chambers and thus assist in preventing excessive rise in temperature due to the production of heat when the clutch slips.

The above-mentioned form of metal to metal clutch has proved satisfactory up till now when used for the transmission of moderately large torques, but the demand for the transmission of higher and higher torques has emphasized its limitations in one particular direction.

Normally, one would need to increase the diameter of the inter-engaging surfaces of the clutch members in order to transmit higher torques than heretofore without over-stressing the said surfaces, but there is a limit to the diameter which can be employed in such clutches when constructed in the known manner.

The limit to the diameter which can be usefully employed in clutches of known construction results from the behaviour of V-grooves inter-engaging surfaces under the influence of heat. The co-efficient of linear expansion of non-ferrous metal is about 50% greater than the co-efficient of linear expansion of ferrous metal, and therefore the difference, in radial dimensions from the axis of rotation of the outer co-acting ridge and V-grooves upon the two inter-engaging friction members, due to the unequal expansion of the dissimilar metals, is greater and greater as the diameter of the clutch is increased. The consequence is that only the outer side of the non-ferrous ridge engages with the complementary V-groove in the ferrous metal when hot and being conical there is a tendency for the whole of the load to be taken on this part.

For example and considering two complementary discs respectively of ferrous and non-ferrous metal of say 12" diameter in which the V-shaped concentric ridges of non-ferrous metal engaged with V-shaped concentric grooves of ferrous metal, the difference in linear expansion for 100° F. rise in temperature is approximately ⅓ of a thousandth of an inch per inch of radius. This means that the outer wedge-shaped ridge and groove are no longer in proper register when hot as the ridge has moved outwards approximately 2 thousandths of an inch from the apex of the groove. In consequence, the depth of penetration by the ridge into the groove is reduced by the amount of 2 thousandths multiplied by the reciprocal of the tangent of the angle of the cone formed by the sides of the ridge.

This amount is sufficient, assuming that there is no metal flexion, to prevent the inner surfaces of the ridge and groove making contact at all. Practical experience has shown that flexion of the non-ferrous metal, short of its elastic limit, does take place to some extent and contact of some kind is obtained by the intermediate ridges and grooves but to a lesser extent than when the ridges and grooves were brought together in a cold state.

Attempts to build larger size clutches, according to this wedge principle have proved to be quite unsuccessful. Following the same reasoning, it will be seen that the displacement of the outer ridge of non-ferrous metal on a 24" radius would be 4 thousandths of an inch and that the entire load would have to be taken on the outer face of one wedge with proportionate increase in surface stress resulting in the surface firing and sticking.

There are many practical advantages attaching to an oil operated metal to metal clutch capable of being contained within the pinions of a multi-speed or reverse reduction gear box. Short thick shafts, rigidity of casing and general convenience render such a type of clutch much superior from an installational point than mechanical friction clutches which have an asbestos fabric friction material and springs and levers for engagement and dis-engagement and the necessity to keep the lubricating oil free from the detritus resulting from wear of friction fabrics.

The invention consists in an oil operated clutch having metal to metal inter-engaging disc-like friction members each having a different co-efficient of thermal expansion and both having a plurality of corresponding concentric rings of inter-engaging conical surfaces and the inner member or members of which clutch form part of the boundary of an operative telescopic oil pressure chamber characterised in that the engagement surfaces of the member of higher co-efficient of expansion are facing the common axis while the engagement surfaces of the other member are facing away from the common axis and all the remaining non-engagement surfaces are relieved to prevent contact.

The invention furthermore consists in a construction as set forth in the preceding paragraph in which, when cold, and in engagement, there is a progressively diminishing clearance between complementary engagement friction surfaces in a direction away from said axis whereby, when the full working temperature of the clutch is reached, and due to unequal expansion of the members, all said surfaces come into engagement.

The invention consists in discontinuing any conception of wedge action and arranging that the inner surfaces of the rings on the non-ferrous disc are in contact with the outer surfaces of the rings of the ferrous metal discs and that the backs or uncontacted portions of the rings are relieved to such an extent that there is no possibility of contact by the disused flanks.

The invention further consists in arranging that from the innermost ring to the outermost ring there is a progressively diminishing clearance between the said faces when cold so that when the full working temperature is reached, then all surfaces are in engagement. The load is purposely placed when cold upon the outer rings only and the load transfers itself inward progressively as the clutch warms up. It will be seen from the ensuing calculations that the surface contact area of the outer rings together of course with the larger moments corresponding to the increased radii enable even one outer ring alone to carry a substantially greater load than all the others collectively. My invention does result in the clutches being made slightly larger than would ostensibly be necessary if a full wedge action were possible and the full area corresponding to the contours of rings and grooves were available for contact. It is further part of this invention to arrange for copious lubrication of these metal faces in order completely to avoid a surface stress.

The accompanying drawings show diagrammatically, and by way of example only, metal to metal V-grooved friction clutches in which:

Figures 1 and 2 show a form of clutch when cold and hot respectively illustrating the disadvantage of the known form of construction, Figures 3 and 4 show a form of construction in accordance with the invention, when cold and hot respectively, illustrating a mode of overcoming the disadvantage of the construction of Figures 1 and 2.

Figures 1 and 2 show a known form of construction of metal to metal V-grooved friction clutch in which the inter-engaging surfaces are shaped during the manufacture when cold so that as intimate a contact as possible is obtained over the inter-engaging surfaces, the concentric wedge-shaped rings being provided, as previously described, on the principle that for a given diameter of clutch a maximum area of surface of contact is obtained.

The two inner disc-like members 1 and 2 are provided with conical surfaces 3 and 4 which co-act with similar surfaces upon the fixed member 5 so that, by the introduction of pressure fluid into the pressure chamber 6 between the movable clutch members 1 and 2 by way of the fluid channel 9 in the shaft 11, the latter are forced apart and contact is made between the friction surfaces upon the movable members and the fixed outer member. The clutch illustrated is disengaged by the application of pressure fluid to the disengaging chambers 7 and 8 by way of the fluid channel 10.

In some earlier forms of known construction every precaution has been taken to prevent the leakage of pressure fluid from the pressure chambers on to the friction surfaces with the idea of preventing slip, but in later forms of known construction the friction surfaces are well lubricated to prevent excessive heat and the destruction of the surfaces when the cluch is allowed to slip. The inner members are splined to the shaft to allow longitudinal movement without relative rotational movement, while the outer members may be provided with teeth 12 in the form of a pinion, the outer member being free to rotate in relation to the shaft on bearings on the latter, or in the casing for the clutch, when the clutch is disengaged, but is drivingly fixed to the shaft when the clutch is engaged.

On comparison between this known clutch when cold as shown in Figure 1 and when at its running temperature as shown in Figure 2 it can be seen that whereas intimate contact is made between all the co-acting conical surfaces on the longitudinally movable and fixed member when the clutch is cold, such intimate contact is not made when the clutch is hot by reason of the inner members being made of bronze and the outer member of steel, and they have different co-efficients of expansion.

When hot the inner members 1 and 2 are unable to engage with their concentric rings so deeply into the concentric grooves on the fixed member as the outer conical ring has expanded radially to a greater extent than that of the corresponding outer groove on the outer member. Consequently, only the outermost of the conical surfaces 3 make proper engagement, and all the other conical surfaces are prevented from mating.

When such a clutch is of moderate radius some contact is made between all the inter-engageable surfaces if the inner members are loaded sufficiently to make them flex, but of course the load is not evenly distributed between the rings. When such a clutch is made of considerable radius in order to be capable of transmitting substantial torques, such flexion of the inner members cannot be relied upon to correct for uneven expansion of the inter-engageable parts.

The need for some measure of compensation for unequal expansion of the inner and outer members can be clearly understood if it is considered that if all the angles are the same, as in the previously known form of construction, the outer non-ferrous ring is displaced from its corresponding ferrous ring by an amount of say 4 thousandths of an inch, being proportional to its radius, while the inner nonferrous ring is displaced from its corresponding ferrous ring by only 1 thousandth of an inch. If an increase of depth of engagement of 5 thousandths of an inch is sufficient to engage the inner ring, 20 thousandths of an inch increase of depth of engagement is necessary for the outer ring before contact is made.

These examples assume the tangent of the angle of the faces to be 0.200.

The surfaces of the relieved portions of the rings need not be conical as they do not make engagement with one another, their shape being determined by the necessity of making the root of each ring of adequate cross section to resist distortion or failure in load. Greatest strength is provided by a ring of approximately triangular shape.

As these rings are each relieved upon one side, a wedging action as was used in some of the prior constructions, is not provided and a copious supply of lubricant is maintained between the engageable surfaces to prevent damage when the clutch is allowed to slip. This also is beneficial in spreading the contact and conducting away heat, as a boundary layer of lubricant is retained even under full load.

The further form of construction in accordance with the invention is shown in Figures 3 and 4 in which the clearance between the inter-engaging surfaces of constant angle are graded at the time of manufacture such that the inner rings have practically no engagement when cold and the outer rings bear strongly one upon the other. This has the effect of transferring the load bearing from the outer rings to the inner rings with progressive rise of temperature. By this expedient the torque carrying capacity of the ferrous rings is adjusted in such a manner that at all temperatures from cold to the maximum the friction surfaces of the appropriate ring then in engagement are of a magnitude great enough to carry the full torque for which the clutch is designed.

By way of example, consider the relative torque capacities at various radii. Assuming for convenience that the width of the surfaces in contact is 1", then the area of the engagement surfaces at 4" radius would be 25.12 sq. ins. At 6" radius, it would be 37.68 sq. ins. and at 10" radius 62.8 sq. ins. Since, however, the torque carrying capacity is a function of the magnitude of the radius, it will be found that the relative torque carrying capacities of the successive rings vary somewhat as of this order:

| | |
|---|---|
| 4" radius | 100.48 |
| 6" radius | 226.08 |
| 10" radius | 628 |

The principle, therefore, of this embodiment becomes clear in that the load carried on the outer portion of the clutch when starting cold and later passes to the centre and inner portions. It will be remembered that the small measure of flexion short of the elastic limit previously alluded to has been found by practical test to be present operates favourably in this construction in order to spread the load over a wider area than would be arrived at by strict calculation with complete rigidity of the metal surfaces.

It can be clearly seen from Figure 3 that only the outermost ring makes proper contact when cold but that when the clutch is hot, as in Figure 4, the area of contact has moved towards the axis thus allowing adequate torque carrying capabilities throughout.

In another application, I have described how a minimum variation of surface area could be achieved with varying temperature by means of a progressively increasing angle of the contact surfaces when moving outward. This can be combined with the features of Figures 3 and 4 so that clearances between the inter-engaging faces of the rings are made progressively greater with decrease of radius, while the angles of the conical surfaces are increased with radius in a compromised manner and thus avoid increasing the angles to the same extent as in the embodiment of Figures 3 and 4 and yet obtain the advantages of both methods of achieving the object of the invention.

It will now be understood from the above that the construction proposed in accordance with the invention have concentric rings which do not rely upon wedge action as heretofore, and that the interengaging surfaces are copiously lubricated.

It is to be understood that the above description is by way of example only and that details for carrying the invention into effect may be varied without departing from the scope of the invention.

I claim:

1. In a fluid operated clutch, a rotatable shaft, metal to metal inter-engaging driving and driven disc-like friction members on the rotatable shaft with the driven member rotatable on the shaft and the driving member secured to but axially movable along the shaft toward and away from the outer member for connecting and disconnecting the driven member to and from the shaft respectively, each member having a different co-efficient of thermal expansion and a plurality of corresponding concentric rings provided with conical engaging surfaces, the conical surface of each ring which faces toward the shaft of the driving member being adapted to engage the conical surface which faces away from the shaft of each ring of the driven member when the clutch is hot, the remaining surfaces being spaced apart so as to prevent contact between such surfaces, and means cooperable with the driving member to provide a pressure fluid accommodating chamber operative upon the introduction of pressure fluid therein to move the driving member toward the driven member.

2. A fluid operated clutch as claimed in claim 1, wherein when the clutch is cold and the driving member has been moved toward the driven member, only the inward facing surface of the outermost ring of the driving member engages the outward facing surface of the outermost ring of the driven member, there being a progressively diminishing clearance between the engagement surfaces in a direction away from the innermost rings to the outermost rings so that when the clutch is hot due to the unequal expansion of the driving and driven members, the inner facing surfaces of all of the rings of the driving member engage the outer facing surfaces of all of the rings of the driven member.

3. A fluid operated clutch including a rotatable shaft, a pair of outer metal disc-like driven members rotatably mounted on the shaft, a pair of inner metal disc-like driving members secured to but axially movable along the shaft toward and away from said driven members for connecting and disconnecting the driven members to and from the shaft, respectively, said pairs of members having different co-efficients of thermal expansion and each pair of members having inner facing and outer facing faces, a plurality of corresponding concentric rings on the face of each driven member, and the outer face of each driving member with each ring having conical surfaces, the inner facing surface of each ring of said driving members being adapted to engage the outer facing surface of each ring of the driven members when the clutch is hot and the other surfaces of the members being spaced apart so as to prevent contact between such surfaces, and the inner face of at least one of the driving members being shaped to provide a pressure fluid accommodating chamber operative upon the introduction of pressure fluid therein to move said driving members toward the driven members for effecting engagement of said surfaces.

References Cited in the file of this patent
UNITED STATES PATENTS

| | | |
|---|---|---|
| 1,872,986 | Lane | Aug. 23, 1932 |
| 2,087,488 | Stanley | July 20, 1937 |
| 2,699,846 | Pitman et al. | Jan. 18, 1955 |
| 2,791,306 | Hindmarch | May 7, 1957 |